United States Patent [19]

Wolfe

[11] Patent Number: 4,753,904

[45] Date of Patent: Jun. 28, 1988

[54] ZIRCONIA-MODIFIED ALUMINA FIBER

[75] Inventor: Michael S. Wolfe, Wilmington, Del.

[73] Assignee: E. I. Du Pont De Nemours and Company, Wilmington, Del.

[21] Appl. No.: 898,119

[22] Filed: Aug. 20, 1986

[51] Int. Cl.$^4$ .................. C04B 35/10; C04B 35/48
[52] U.S. Cl. ............................. 501/95; 501/105
[58] Field of Search ............................. 501/95, 105

[56] References Cited

U.S. PATENT DOCUMENTS

| | | | |
|---|---|---|---|
| 3,808,015 | 4/1974 | Senfert | 501/95 |
| 3,950,478 | 4/1976 | Kenworthy et al. | 501/95 |
| 3,992,498 | 11/1976 | Morton et al. | 264/63 |
| 4,125,406 | 11/1978 | Sowman | 501/95 |
| 4,159,205 | 6/1979 | Miyahara | 501/153 |
| 4,316,964 | 2/1982 | Lange | 501/105 |
| 4,320,074 | 3/1982 | Birchall et al. | 501/127 |

FOREIGN PATENT DOCUMENTS 1264973 2/1972 United Kingdom .
1360198 7/1974 United Kingdom .

OTHER PUBLICATIONS

J. of Materials Science, 19 (1984) 2233-38.
J. of American Ceramic Society, 67, N3, 164-68.
J. of Materials Science Letters 4 (1985), 1067-70.

Primary Examiner—Mark L. Bell

[57] ABSTRACT

Alumina fiber modified by stabilized zirconia has improved strength and strength retention after high temperature exposure.

4 Claims, 1 Drawing Sheet

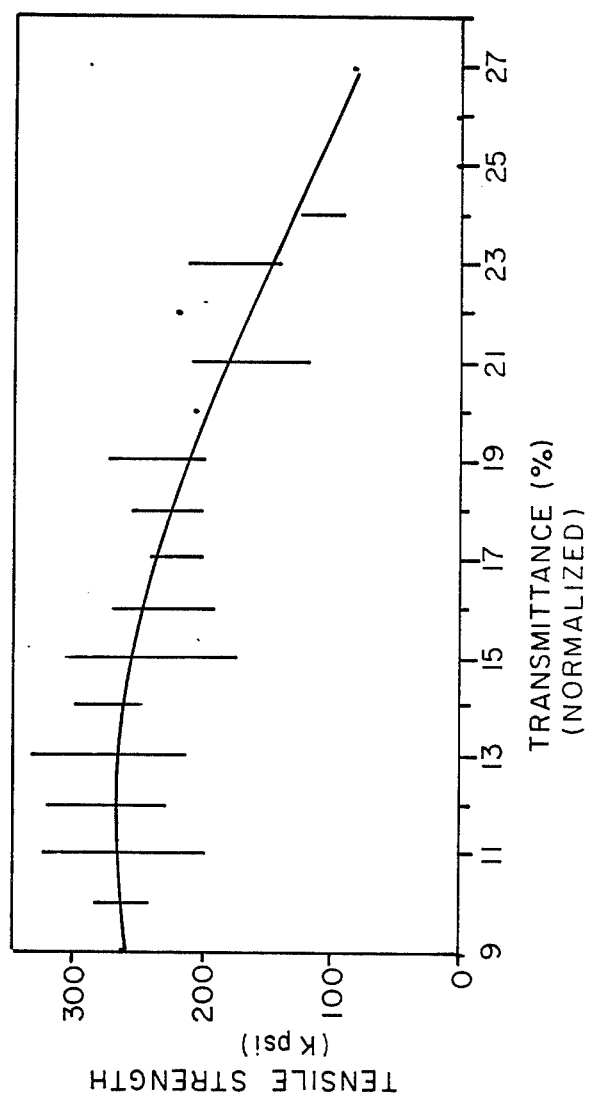
FIGURE

ZIRCONIA-MODIFIED ALUMINA FIBER

BACKGROUND OF THE INVENTION

Ceramics possess attractive mechanical and thermal properties. A major limitation to their use is a lack of strength and toughness. Unlike most polymers and metals, ceramics generally are unable to absorb damage without catastrophic failure. Much attention has been given to developing strength and toughness in ceramics.

One route to improved ceramic strength is based on the transformation of zirconia from the tetragonal to the monoclinic phase with resulting increase in volume. This phenomenon is reported in both patent and scientific literature (Lange, U.S. Pat. No. 4,316,964; J. Materials Science 19, 2233 (1984). Zirconia is also known in the art (J. American Ceramic Society, 67, N.3, 164 (1984); J. of Materials Science Letter 4, 1067 (1985) to inhibit grain growth in ceramics. High strength ceramic fibers which contain at least 60% alumina are taught in Seufert, U.S. Pat. No. 3,808,015. An object of this invention is to provide alumina fibers of greater strength and strength retention after high temperature exposure.

DRAWINGS

The FIGURE is a graph showing the relationship between tensile strength in Kpsi (thousand pounds per square inch) and percent (%) normalized transmittance of visible light for a series of single fibers of zirconia-modified alumina.

SUMMARY OF THE INVENTION

The present invention provides a ceramic fiber of from 10 to 25 microns in diameter containing at least 60% by weight of alpha alumina, between 15 and 25% by weight of zirconia in the tetragonal phase and from 0.4 to 12 mole %, based on zirconia, of a zirconia stabilizer, the zirconia having a grain size of less than 0.5 microns in diameter, said fiber having a light transmittance of 19% or less when normalized, as measured in an inert fluid having a refractive index of 1.72.

DETAILED DESCRIPTION OF THE INVENTION

The fiber of the invention is a ceramic fiber, containing at least 60% by weight of alpha alumina. In addition to the alumina, there is between 15 and 25% by weight of zirconia and between 0.4 and 12 mole percent, based on zirconia, of a zirconia stabilizer. Preferably the fiber consists essentially of alpha alumina, zirconia and yttria and is about 10 to 25 microns in diameter.

The alumina in the fiber is derived from a dispersion of alumina particles and from a soluble alumina precursor. The alumina particle size distribution should be as follows: 99% smaller than 1 micron, 95% smaller than 0.5 micron, as determined by standard "Sedigraph" measurement. Particulate materials can be classified by any of a variety of known techniques. In one method for preparing such particles, alpha alumina (Alcoa A-16SG) is dispersed in water at 15% solids at a pH of 4.0 and allowed to settle in a tank. Portions of the dispersion are removed from the top of the sedimentation tank and concentrated to the desired solids level for use. This technique was employed in preparing the slurry of Example 1 below.

Preferred soluble alumina precursors include the basic aluminum salts, such as alumina chlorohydroxide, basic aluminum nitrate, and basic aluminum chloroacetate, which have a basicity of 0.33 to 0.83. Aluminum chlorohydroxide is most preferred. Basicity can be adjusted by addition of HCl or other chemicals.

The zirconia content can be derived from a variety of zirconium containing chemicals, including zirconium oxychloride, zirconium acetate, and zirconia particulate. The zirconia particles are commercially available with yttrium oxide and with other stabilizers already added. In one method of using zirconia particles, zirconia particles ("Zircar" Type ZYP) are dispersed in water at 15% solids at pH 2.5 in a four-liter beaker. The dispersion is allowed to settle for 24 hours, and the top 5 centimeters of liquid out of the total 20 centimeters in the beaker are removed and concentrated for use.

Stabilizers for zirconia are well known in the art to promote retention of the metastable tetragonal phase of zirconia (see U.S. Pat. No. 4,316,964). The zirconia stabilizer can be incorporated as any of a variety of alkaline earth or rare earth compounds such as chlorides and oxides. These would include MgO, CaO, $Y_2O_3$, $CeO_2$, and mixtures thereof. These should be present in quantities between 0.4 and 12 mole % based on zirconia.

Various ways of compounding materials may be employed. The general procedures are described in the aforementioned Seufert patent. Thus, an aqueous dispersion of alumina particles may be combined, in appropriate quantities, with a solution of a zirconium salt, aluminum chlorohydroxide and an yttrium salt. Another method involves combining a slurry of zirconia particles containing yttrium oxide with an alumina slurry and aluminum chlorohydroxide. The mix is stirred, heated, and dewatered for sufficient time to obtain 45 to 65% solids at a useful viscosity. Too much heating must be avoided as this can cause the mix to lose its extensible viscosity.

The mix can be converted into fiber in a variety of ways, including drawing from a beaker with a spatula, centrifugal spinning, and extrusion through spinneret holes. For extrusion through a spinneret a viscosity of 400 to 1200 poise is useful. As fibers are formed, they are partially dried to provide the strength necessary to further process the fibers. The fibers can be collected in a variety of ways including being wound up on a bobbin or piddled into a basket. The fibers are further dried and volatiles removed by heating to 400° to 1000° C.

The fibers of the invention are prepared by sintering the dried fibers at high temperature to complete the formation of the microstructure and achieve full density and strength. This sintering can be accomplished by placing the fiber in a furnace or flame, or drawing it through a furnace or flame as in Seufert above. In one method, individual fibers are held in the flame of a propane/air torch for a length of time between one and ten seconds. The fibers treated by this method become white hot. In the sintering process, the higher the temperature, the shorter the time required for treatment. When sintering in a flame, the type of flame in terms of the fuel-to-oxidant ratio is important. Also, consideration must be given to the number of fibers in the yarn bundle, the diameter of the fibers, and the composition of the fibers in choosing the proper sintering conditions which will provide fibers having a level of light transmittance within the scope of the present invention. It will be understood that firing conditions may vary somewhat from those mentioned above. The transmittance of light through the fibers of the invention is 19% or less.

While the applicant does not wish to be bound by any particular theory, it has been observed that there is a correlation between the tensile properties of the fibers of the invention and the transmittance of light through the fibers. Scanning electron microscopy (SEM) was employed to analyze the microstructure of the fibers. Two modes of operation of the SEM were used in the analyses. An energy dispersive X-ray (SEM/EDX) technique was used to identify the elemental composition of the grains within the fiber and a backscattered electron detection technique was used to identify, locate and produce images of the zirconium containing grains in a cross-section of a fiber. Using these techniques, it was observed that fibers which have a low light transmittance also have well defined, localized zirconia particles. For samples with higher light transmittance, the microstructural evidence suggests less localized and more dispersed zirconia in the fibers.

The zirconia in the fired fibers is in the tetragonal form and consists of grains with a maximum size of 0.5 microns or less in diameter. The alumina grain size in the fired fiber is also less than 0.5 microns in diameter.

The technique used to measure zirconia grain sizes relies on the images obtained using a backscattered electron detector of a scanning electron microscope (SEM). In this technique, the zirconia containing grains appear in photomicrographs as bright areas which can be measured against the magnification dependent calibration bar appearing on the photomicrograph. The samples are prepared by mounting in epoxy resin and polishing to a smooth surface with diamond compounds using standard techniques. Once placed in the instrument, a signal is generated from the sample and is enhanced by adjusting the SEM instrument's backscattered electron detector for maximum atomic number contrast. In this manner, one can easily distinguish the zirconia grains from the alumina grains and the size of the zirconia grains can be measured directly from their images.

If desired, the fibers of the invention may be coated with silica which has been shown in Tietz, U.S. Pat. No. 3,837,891, to have a beneficial effect on alumina fiber strength.

Test Procedures and Measurements

Transmittance

Since the alumina and zirconia remain as separate phases in the fiber of the invention and since the most important microstructural features of the fiber appears to be the size, distribution, and phase composition of the zirconia particles, observation of the transmittance of light through the fibers immersed in a fluid of refractive index 1.72 provides a convenient tool for describing the microstructure. Any standard technique for measuring light transmittances may be used where the scattering light due to alumina surfaces is removed by immersing the fibers in a fluid of refractive index 1.72. One method for quantifying the difference between microstructures based on the level of transmitted light relies on the use of a microscope equipped with a photo multiplier to quantify the percent transmittance of light through the fibers.

Fibers to be tested are carefully placed approximately parallel on a microscope slide. For cases where the transmittance measurement is to be related to physical properties, such as tenacity, filaments are first tested for tensile strength and the broken filament is recovered, placed on the microscope slide and labelled for identification. A glass cover slip (No. 1/2, 18 mm square) is placed over the fibers, and a drop of fluid is placed at an edge of the cover slip. The fluid used is Cargille Certified Refractive Index Liquid, Series M, $n^D25 = 1.720$ manufactured by R. P. Cargille Laboratories. Capillary action draws the fluid under the cover slip. Care should be taken to exclude air bubbles for the slide preparation.

A Leitz MPV Compact Microscope Photometer attached to a Leitz Laborlus 12 Pol (or equivalent) microscope with a light source in which the intensity is controlled by a stabilized power supply is used to measure the light transmission through the fibers relative to the background. The microscope is adjusted for Koehler illumination. The fibers are screened at approximately X400 to find the fiber judged to have the smallest diameter. A X63 objective is swung into the optic train, providing a magnification of approximately X630, and the fiber is brought into focus. A measure of the diameter is obtained by counting the number of eyepiece reticle divisions occupied by the fiber diameter. The photometer housing contains a rectangular diaphragm which is set to approximately two-thirds of the fiber diameter, i.e., if the smallest diameter fiber corresponds to 12 reticle divisions, the diaphragm width would be set to 8 reticle divisions. By reference to the eyepiece reticle, the length of the rectangular diaphragm is set to twice the width. The slide preparation is moved so that the diaphragm occupies a field free of fibers and the intensity of the light source is adjusted until the digital display unit of the control panel reads 110. The zero adjustment is obtained by blocking the light path into the photometer housing. The range of 0–110 was chosen because 110 is the upper limit at which the photomultiplier response is linear. Several repeats of this initialization procedure may be needed to ensure that the digital display reads zero with the light path blocked and 110 when the light path is unblocked. After the initial adjustments, the slide is moved so that a fiber is positioned under the diaphragm. The diaphragm is rotated until its long axis is parallel to the fiber axis, then the fiber is positioned concentrically relative to the diaphragm. The measurement is taken for a duration of ¼ second by setting the measured value integration switch to the "T4" position. Several readings are obtained to confirm measurement reproducibility. Three regions along each fiber are measured corresponding to locations near the cover slip edges and near the center of the cover slip. The readings for each fiber represents the average of the three measurements. A value for transmittance is calculated by multiplying the reading by 100/110. For each successive slide preparation, the Koehler illumination, light intensity and diaphragm dimensions are readjusted to account for any changes in slide preparation thickness or fiber diameter.

The light transmittance determination is not measurably affected by variations in the amount of zirconia in the composition over the range of 15 to 25 weight %. A correction is applied to normalize the transmittance values for variations in fiber diameter. The correction is derived from application of Beer's law:

$$A = -\log T = abc$$

where A is absorbance, T is transmittance, a is the extinction coefficient for the fiber's composition, b is the light path length or fiber diameter, and c is concentration of the light absorbing species. The transmittances reported throughout this specification and claims were normalized to a fiber diameter of 20 microns, as follows:

$$\frac{-\log T_a}{-\log T_n} = \frac{\text{Fiber Diameter}}{20} \text{ (microns)}$$

where $T_a$ is the actual measured transmittance and $T_n$ is the normalized transmittance.

Tensile Testing

In this method, single fibers are selected at random and their diameters are measured using a calibrated optical microscope. The gauge length used is one-quarter of one inch. The clamps of the Instron tensile tester are covered with "Neoprene". The head speed (or strain rate) is 0.02 in/min. The tensile strength results are the average of ten individual fiber breaks from each sample.

Tetragonal Phase Identification

X-ray diffraction analysis was used to determine the zirconia crystal phase. A Philips single-axis (horizontal) goniometer in reflection mode (CuK α radiation) with digital data collection is employed for this purpose. The most intense X-ray reflection for tetragonal zirconia occurs at the two-theta scattering angle 30.3°; for the monoclinic form, the strongest two reflections occur at 28.3° and 31.6°. Determination of the tetragonal: monoclinic ratio is accomplished by scanning the 25°–35° range.

Grain Size Determination

Images of the cross-sections of zirconia containing alumina fiber are used to measure the grain size and spatial distribution of the zirconia. The samples are prepared by mounting in epoxy resin and polishing to a smooth surface. The mounted samples are vapor coated with carbon to provide a conductive surface and placed in a JEOL JXA 840 Scanning Electron Microscope. Optimization of the backscattered electron signal is obtained on each sample by biasing for maximum contrast between the alumina and zirconia phases and recording the images on Polaroid Type 52 film. The instrument settings include an acceleration voltage of 20 kV, current of $1 \times 10$ raised to the power $-8$ Amps, final aperture of 70 microns, filament consisting of a tungsten hairpin, working distance of 15 millimeters, and a magnification of about 10,000 X. From the images made by this technique, the size and distribution of the zirconia containing grains are determined.

EXAMPLE 1

This example illustrates preparation of a continuous yarn of zirconia-modified alumina fibers.

Into a mixing vessel 41.4 parts (by weight) of 56.9% solids alumina-particulate slurry are added. To this stirred slurry, 37.6 parts of zirconyl acetate solution are added. The zirconyl acetate solution could be converted into approximately 21.7% zirconia. Also, to this stirred mixture are added 0.9 parts of 37% hydrochloric acid and 18.6 parts of aluminum chlorohydroxide powder. The aluminum chlorohydroxide could be converted into approximately 47.3% aluminum oxide. Finally, 0.8 parts of yttrium chloride hexahydrate in 0.7 parts of water are added. The mixture is stirred overnight. Water is removed by vacuum and heating to obtain a viscosity of approximately 450 poises. The spin mix is then pumped through a filter assembly and a spinneret with 200, 4.5 mil diameter holes.

Fibers are extruded from the spinneret at a rate of 110 grams/min. into a heated spinning column and dried by a flow of heated (80°–110° C.), dried air. A spin finish is applied to the yarn at the bottom of the column. The fibers are drawn at the bottom of the column by two attenuating rolls and wound up at a rate of 250 to 320 meters/min. To allow for later shrinkage, microfoam sheeting is first wrapped around the wind-up bobbin. Fiber is wound on a bobbin for 9 to 15 minutes.

Volatiles are driven out of the fiber in a furnace by incremental heating to 600° C. and then held at that temperature for one hour. The bobbin of yarn is back-wound through a propane/oxygen flame (residence time approximately one second) so that the yarn becomes white hot. The yarn had a temperature of about 1940° C. as measured with an infrared optical pyrometer. Different backwinding speeds required different amounts of heating to obtain optimum fiber properties.

The resulting fibers had an average diameter of 18 to 20 microns, greater than 60 weight % alumina, 20 weight % zirconia, substantially all in the tetragonal phase, 2 mole % yttrium oxide, based on zirconia, zirconia grain size of less than 0.5 microns, a transmittance of 18%, and a tensile strength of 305 kpsi when well sintered.

In place of zirconyl acetate solution, a dispersion of zirconia particulate can be used. In such a case, the amount of alumina particulate would be decreased by an amount equal to the amount of zirconia particulate. The aluminum chlorohydroxide would be increased so that the total amount of alumina in the fiber (alumina from particulate and chlorohydroxide) would not be changed.

EXAMPLE 2

The FIGURE is a curve representing a plot of normalized transmittance versus tensile strength values for 88 fibers of alumina containing 20% of zirconia and small amounts of yttria. The table below shows the number of filaments examined between levels of transmittance, the average tensile value as well as the maximum and minimum tensile values for filaments in that transmittance category. The table shows that the filaments in the category having a normalized transmittance of between 12 and 14 percent exhibited the highest average tensile strength of filaments in any other category. Further, the strengthening benefits due to the use of zirconia disappear or are greatly reduced as the transmittance value exceeds 19 percent.

TABLE

| % Normalized Transmittance | Number of Filaments | Average Tensile (Kpsi) | Maximum Tensile (Kpsi) | Minimum Tensile (Kpsi) |
|---|---|---|---|---|
| 9.0 | 1 | 264.00 | 264 | 264 |
| 10.0 | 7 | 259.57 | 298 | 232 |
| 11.0 | 11 | 257.82 | 319 | 129 |
| 12.0 | 11 | 272.73 | 357 | 206 |
| 13.0 | 18 | 268.50 | 364 | 126 |
| 14.0 | 10 | 266.70 | 307 | 210 |
| 15.0 | 6 | 237.67 | 322 | 137 |
| 16.0 | 3 | 229.00 | 287 | 195 |
| 17.0 | 2 | 218.50 | 239 | 198 |
| 18.0 | 2 | 226.50 | 254 | 199 |
| 19.0 | 5 | 234.80 | 297 | 193 |
| 20.0 | 1 | 205.00 | 205 | 205 |
| 21.0 | 3 | 161.33 | 216 | 108 |
| 22.0 | 1 | 218.00 | 218 | 218 |
| 23.0 | 4 | 172.00 | 222 | 115 |

TABLE-continued

| % Normalized Transmittance | Number of Filaments | Average Tensile (Kpsi) | Maximum Tensile (Kpsi) | Minimum Tensile (Kpsi) |
| --- | --- | --- | --- | --- |
| 24.0 | 2 | 106.50 | 126 | 87 |
| 25.0 | 0 | | | |
| 26.0 | 0 | | | |
| 27.0 | 1 | 81.00 | 81 | 81 |

I claim:

1. A ceramic fiber of from 10 to 25 microns in diameter containing at least 60% by weight of alpha alumina, between 15 and 25% by weight of zirconia in the tetragonal phase, and from 0.4 to 12 mole %, based on zirconia, of a zirconia stabilizer, the zirconia having a grain size of less than 0.5 microns, said fiber having a normalized light transmittance of 19% or less as measured in an inert fluid having a refractive index of 1.72.

2. The fiber of claim 1 containing about 20% by weight of zirconia.

3. The fiber of claim 1 wherein the zirconia stabilizer is yttria.

4. The fiber of claim 1 having a normalized light transmittance of 16% or less.

* * * * *